(No Model.)
F. WANNEVEICH.
PULVERIZING MILL.
No. 350,225. Patented Oct. 5, 1886.
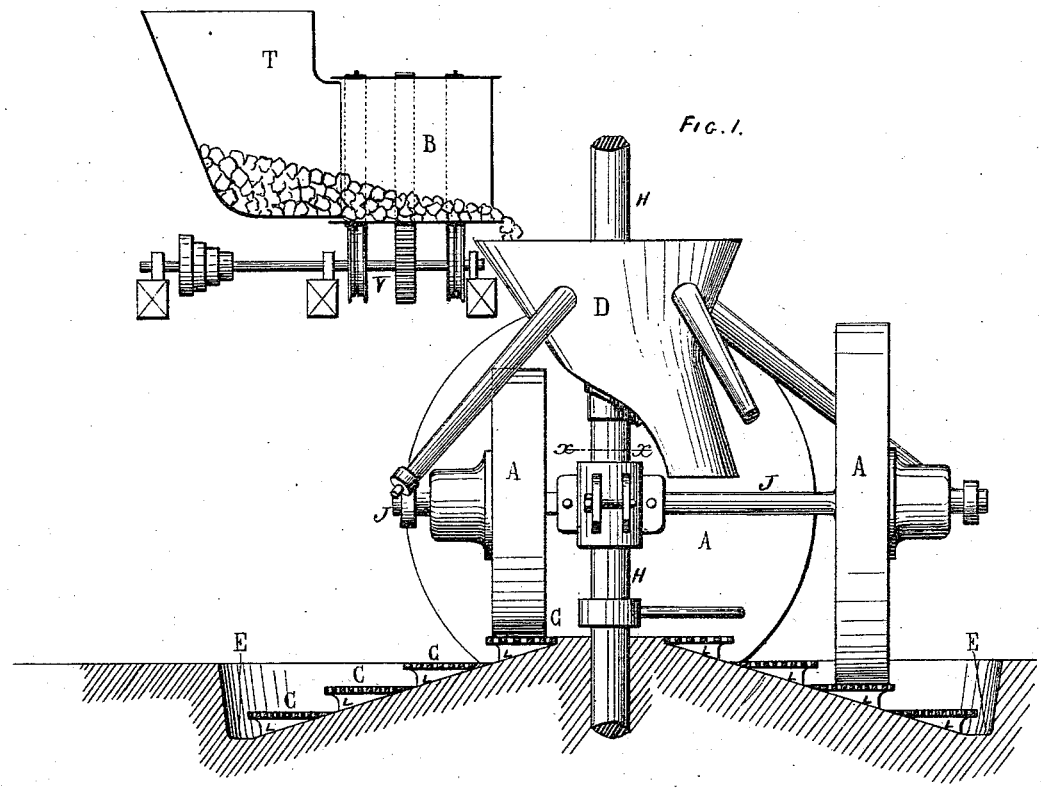
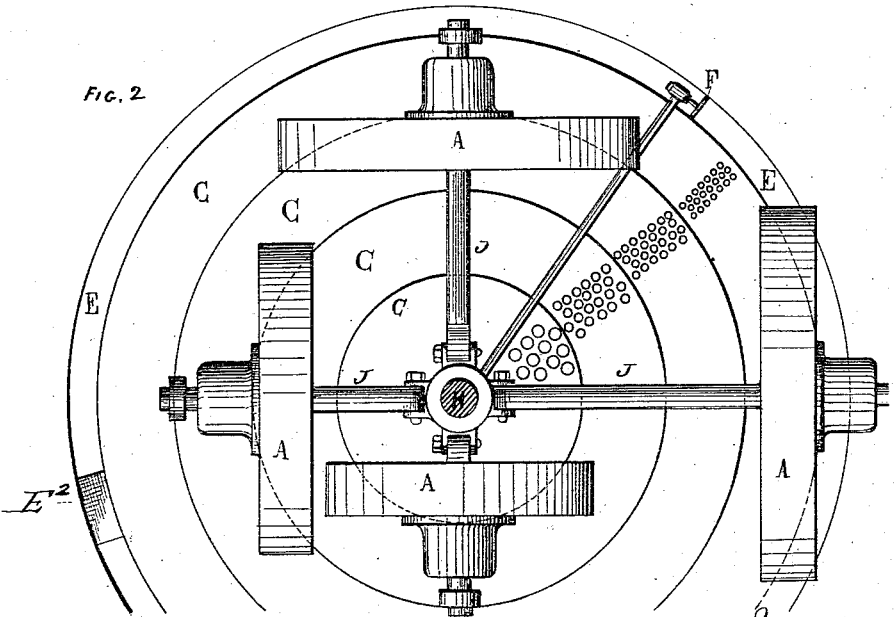
Witnesses
Chas. H. Smith
J. Staib
Inventor
Frederic Wanneveich
per
Lemuel W. Serrell atty

UNITED STATES PATENT OFFICE.

FREDERIC WANNEVEICH, OF ST. DENIS, SEINE, FRANCE.

PULVERIZING-MILL.

SPECIFICATION forming part of Letters Patent No. 350,225, dated October 5, 1886.

Application filed June 1, 1885. Serial No. 167,198. (No model.) Patented in France December 11, 1879, No. 132,849; in England June 26, 1882, No. 3,015; in Belgium November 30, 1883, No. 63,226, and in Germany September 23, 1885, No. 32,867.

*To all whom it may concern:*

Be it known that I, FREDERIC WANNEVEICH, of St. Denis, (Seine,) in the Republic of France, have invented an Improvement in Pulverizing-Mills, of which the following is a specification.

Roller-mills have heretofore been made with concentric beds over which the crushing-rollers traveled, and in some instances these beds have been grooved, and in others the beds have been flat, and various devices have been employed for conveying the crushed material from one bed to the next in order to subject it to a recrushing operation.

My invention consists in the combination, with the crushing-rollers and their shafts, of a number of annular beds arranged stepwise and having openings therein for the passage of the crushed material, and a conical base upon which the beds are supported to direct the crushed material as it falls through the openings in one bed to the surface of the bed next below it.

In the drawings, Figure 1 is an elevation, partly in section, of the mill complete; and Fig. 2 is a plan, the hopper being removed and the driving-shaft in section.

H represents a vertical shaft that is to be supported in suitable bearings and driven by power.

J are horizontal shafts or axles carried by said shaft H, and upon each axle J there is a crushing-roller, A, fitted to turn freely.

C C are annular beds over which the rollers A travel, and these beds are concentric with the shaft H, and arranged stepwise, the smallest being at the top. I have shown four of these beds C, with a roller, A, for each bed; but the number of beds may be more or less than that shown. These beds are to be of metal, and they may be supported in any desired manner. Each is provided with openings of suitable size to allow the crushed material to pass through, the openings in the top bed being the largest, those in the bed next below smaller, and so on to the last bed, where the openings are the smallest. The openings in the beds are shown in the plan, Fig. 2, only in a part of each bed. The annular beds are supported upon a conical base, L, and said conical base causes the crushed material as it falls through the openings of one bed to pass to the surface of the bed next below it, where said crushed material is subjected to a further crushing operation to reduce it still finer, and through the openings of this second bed the crushed material falls upon the conical base, which directs the material to the surface of the third bed, and so on to the last bed. From the last bed the conical base L directs the crushed material into a circular trough, E, from which it is removed by a scraper, F, carried by the shaft H, there being an opening at $E^2$ in the trough E, through which such material passes. By this arrangement of beds with openings for the escape of the crushed material there is no clogging of the mill by the finer particles lying upon the bed and preventing the coarser particles being crushed, and the conical base insures the passage of the crushed material from one bed to the bed next below it.

The material may be fed to the beds in any suitable manner. I have shown a hopper, T, into which the material to be crushed is placed, and from this hopper said material passes into a cylinder, B, that is slightly inclined. Said cylinder is to be slowly revolved by the shaft and gearing V, and the rotation of this cylinder causes the material to pass into the distributer D, that turns with the shaft H, and has a spout that delivers the material upon the top bed, C.

I claim as my invention—

The combination, with the annular beds arranged stepwise, and having openings for the escape of the crushed material, and the conical base upon which said beds are supported, of the crushing-rollers, and shafts by which they are moved, substantially as specified.

The foregoing specification of my improvement in mills for pulverizing or granulating hard materials signed by me this 29th day of April, 1885.

FREDERIC WANNEVEICH.

Witnesses:
 JULES DE CLERCY,
 LUCIEN THETMOR.